(12) United States Patent
Ito et al.

(10) Patent No.: US 7,642,985 B2
(45) Date of Patent: Jan. 5, 2010

(54) SEAT FOR VEHICLE

(75) Inventors: Koji Ito, Yatomi (JP); Hitoshi Takayanagi, Kariya (JP); Koichi Hirota, Takahama (JP); Fumio Yajima, Sakura (JP); Nobumasa Misaki, Sakura (JP)

(73) Assignees: Aisin Seiki Kabushiki Kaisha, Kariya-Shi, Aichi-Ken (JP); Fujikura Ltd., Koto-Ku, Tokyo (JP)

( * ) Notice: Subject to any disclaimer, the term of this patent is extended or adjusted under 35 U.S.C. 154(b) by 140 days.

(21) Appl. No.: 11/598,780

(22) Filed: Nov. 14, 2006

(65) Prior Publication Data

US 2007/0115120 A1 May 24, 2007

(30) Foreign Application Priority Data

Nov. 17, 2005 (JP) .............................. 2005-333022

(51) Int. Cl.
*H01Q 1/32* (2006.01)
(52) U.S. Cl. ...................... 343/842; 340/562; 340/686.6
(58) Field of Classification Search ................. 343/742, 343/788, 867, 842; 340/425.5, 436, 438, 340/562, 686.6
See application file for complete search history.

(56) References Cited

U.S. PATENT DOCUMENTS

| | | | |
|---|---|---|---|
| 6,253,133 B1 * | 6/2001 | Sakai et al. | 701/45 |
| 6,275,146 B1 * | 8/2001 | Kithil et al. | 340/425.5 |
| 6,378,900 B1 * | 4/2002 | Stanley et al. | 280/735 |
| 6,402,195 B1 | 6/2002 | Eisenmann et al. | |
| 6,404,074 B2 | 6/2002 | Saito et al. | |
| 6,556,137 B1 * | 4/2003 | Oka et al. | 340/561 |
| 6,559,555 B1 * | 5/2003 | Saitou et al. | 307/10.1 |
| 6,693,440 B2 * | 2/2004 | Basir et al. | 324/662 |
| 7,098,674 B2 * | 8/2006 | Stanley et al. | 324/662 |
| 7,497,465 B2 * | 3/2009 | Wato et al. | 280/735 |
| 2006/0284731 A1 * | 12/2006 | Ando et al. | 340/561 |
| 2009/0062989 A1 * | 3/2009 | Sakai et al. | 701/45 |

FOREIGN PATENT DOCUMENTS

| | | |
|---|---|---|
| DE | 199 16 804 C1 | 8/2000 |
| FR | 2884775 A | 10/2006 |
| JP | 2645583 B2 | 8/1997 |
| JP | 2002-101993 A | 4/2002 |
| JP | 3347069 B2 | 11/2002 |

OTHER PUBLICATIONS

Preliminary Search Report issued in corresponding French Application No. FR 06 10085 dated Nov. 26, 2008.

* cited by examiner

*Primary Examiner*—Douglas W Owens
*Assistant Examiner*—Chuc D Tran
(74) *Attorney, Agent, or Firm*—Buchanan Ingersoll & Rooney PC

(57) ABSTRACT

A seat for a vehicle includes: a detecting sensor detecting an occupant having a planar antenna electrode, at which electric filed is generated, and a ground electrode arranged with a clearance along an outer periphery of the antenna electrode. The antenna electrode can be provided with a hole at the center of the antenna electrode.

4 Claims, 3 Drawing Sheets

F I G. 5
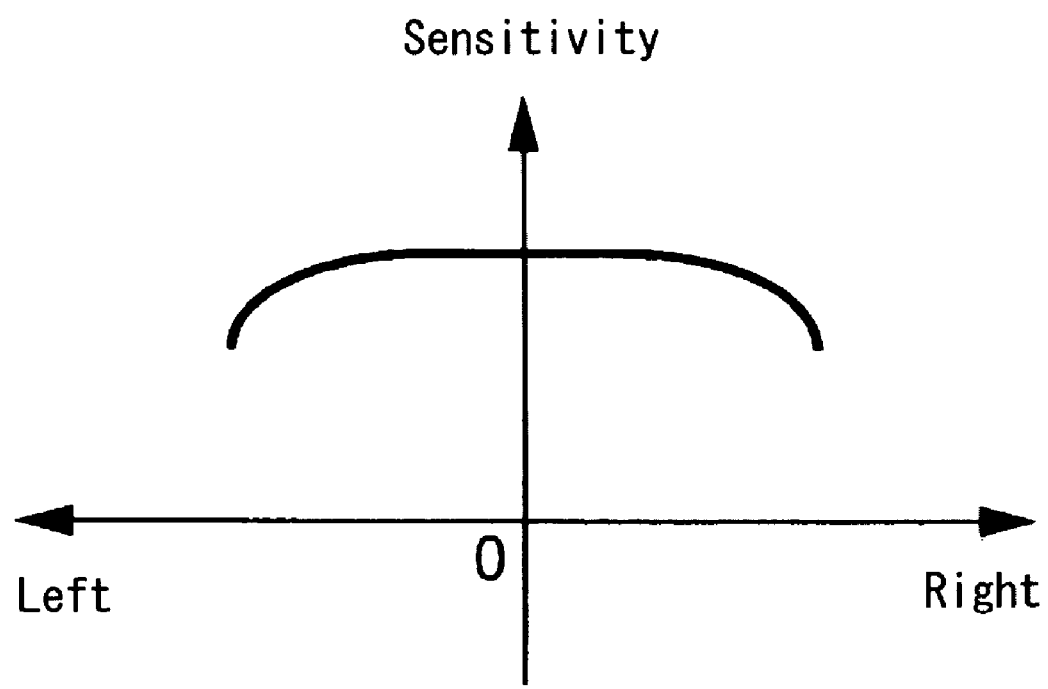

US 7,642,985 B2

SEAT FOR VEHICLE

CROSS REFERENCE TO RELATED APPLICATIONS

This application is based on and claims priority under 35 U.S.C. §119 to Japanese Patent Application 2005-333022, filed on Nov. 17, 2005, the entire content of which is incorporated herein by reference.

FIELD OF THE INVENTION

The present invention relates to a seat for a vehicle such as an automobile.

BACKGROUND

It has been known that seatbacks for vehicles, such as an automobile, which seatback is provided with a plurality of band-shaped antenna electrodes spaced in an up and down direction, for example as disclosed in Japanese Patent No. 3347069 (US6404074B2). A presence or absence of an occupant or a position of a head of an occupant is detected on the basis of a value of electric current supplied to these antenna electrodes.

Such back supporting portion is provided with a plurality of rectangular-shaped electrodes on which electric field is generated. Electric lines of force, which are not necessarily utilized for detecting an occupant, are emitted from these electrodes to surroundings and may badly influence on electronic applications such as audio equipments, radio equipments and so on. Besides, each back supporting portion is provided with several separated electrodes such that an initial capacity of the set of the electrodes is not determined until being assembled at the back supporting portion or the seatback. Therefore, fluctuations of the initial capacity of the electrode set are likely to be large. This may cause measuring or detecting within a wide measuring range and may deteriorate sensitivity for occupant detection.

The present invention has been made in view of the above circumstances, and provides a seat for a vehicle, which enables to detect an occupant while restraining detrimental effects to surroundings.

SUMMARY OF THE INVENTION

According to an aspect of the present invention, a seat for a vehicle includes: a detecting sensor detecting an occupant, the detecting sensor including a planar antenna electrode, at which electric filed is generated, and a ground electrode arranged with a clearance along an outer periphery of the antenna electrode.

According to another aspect of the present invention, a seat for a vehicle includes: a detecting sensor detecting an occupant and including a planar antenna electrode, at which electric filed is generated, the antenna electrode formed with a hole at a center thereof.

BRIEF DESCRIPTION OF THE DRAWINGS

The foregoing and additional features and characteristics of the present invention will become more apparent from the following detailed description considered with reference to the accompanying drawings, wherein:

FIG. 5 is a diagram for explaining sensitivity characteristics of a detecting sensor according to an embodiment of the present invention.

DETAILED DESCRIPTION

An embodiment will be described below with reference to the attached drawings.

Figure 1:
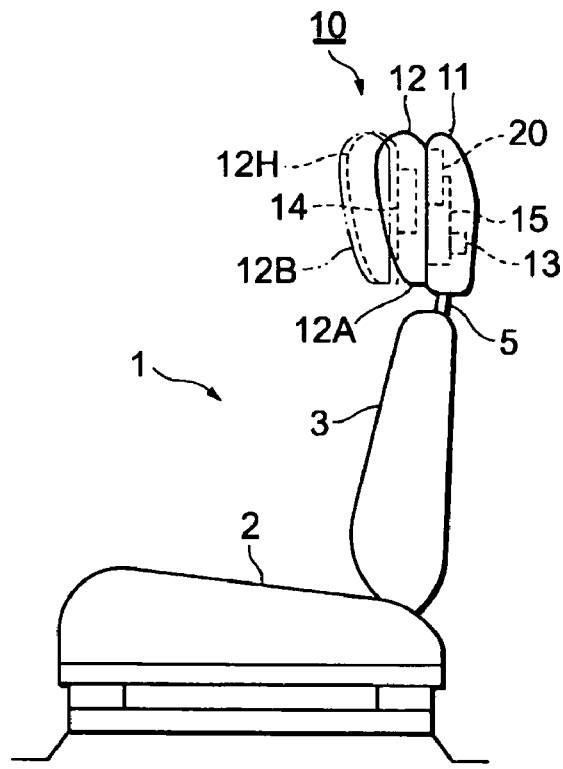
FIG. 1 is a side view illustrating a seat for a vehicle.

FIG. 1 is a side view illustrating a seat 1 for a vehicle according to the embodiment of the present invention. This seat 1 is employed as a passenger's seat for a vehicle. As illustrated in FIG. 1, the seat 1 includes a seat cushion 2; a seatback 3 supported by the seat cushion 2 to be tilted back and forth; and a headrest apparatus 10.

The headrest apparatus 10 includes: a headrest rear portion 11; a headrest front portion 12; a motor 13, which serves as driving means for moving the headrest front portion 12 relative to the headrest rear portion 11; and a detecting sensor 14 provided in the headrest front portion 12. An ECU (electronic control unit, controlling means) 20 controls the motor 13 on the basis of results detected by the detecting sensor 14.

The headrest rear portion 11 is supported by a headrest stay 5 fixed to an upper end portion of the seatback 3. The headrest front portion 12 is moved forward and backward between a fully retracted position 12A, at which the headrest front portion 12 is closely in contact with the headrest rear portion 11, and a fully expanded position 12B, at which the headrest front portion 12 is away from the headrest rear portion 11. The fully retracted position 12A is denoted with a solid line in FIG. 1, while the fully expanded position 12B is denoted with a two-dot chain line therein. When a vehicle is driving at a normal condition, the headrest front portion 12 is located at the fully retracted position 12A.

A driving mechanism 15, which serves as the driving means, is allocated between the headrest rear portion 11 and the headrest front portion 12. The driving mechanism 15 is driven by the motor 13 so that the headrest front portion 12 is moved back and forth relative to the headrest rear portion 11

Figure 2A:
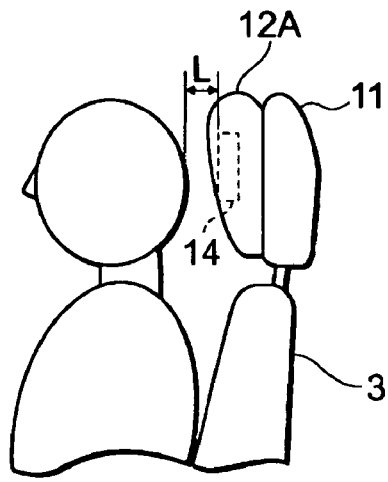
FIG. 2A is a side view for explaining an operation of a headrest front portion.
Figure 2B:
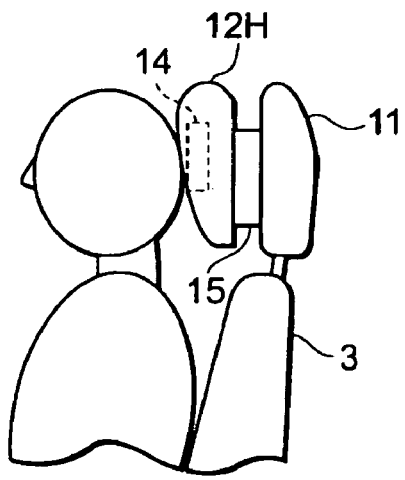
FIG. 2B is another side view for explaining the operation of the headrest front portion.

The detecting sensor 14 is provided in the headrest front portion 12 and detects, on the basis of changes of electric field, a presence of a detected object, i.e., a head of an occupant, within a detection range L, as illustrated in FIG. 2A.

When the risk of a rear-end collision of a vehicle is predicted, the ECU 20, which controls the driving mechanism 15, moves the headrest front portion 12 from the fully retracted position 12A toward the fully expanded position 12B. In such circumstances, if the risk of the rear-end collision of the vehicle was avoided, the ECU 20 controls the motor 13 so as to return the headrest front portion 12 to the fully retracted position 12A.

When the ECU 20 moves the headrest front portion 12 toward the fully expanded position 12B, the ECU 20 judges, based on detection results of the detecting sensor 14, an approach of the headrest front portion 12 to a head of a seated occupant and detects an approach of the detecting sensor 14, i.e., of the headrest front portion 12 to the occupant's head.

When the ECU 20 determines the reaching of the headrest front portion 12 at the occupant's head, the ECU 20 stops the forward movement of the headrest front portion 12 at a stop position 12H, at which the headrest front portion 12 reaches the head of the seated occupant. When the ECU 20 doesn't not detect the reaching of the headrest front portion 12 at the occupant's head in a state where the headrest front portion 12 is moving towards the fully expanded position 12B, the ECU 20 moves the headrest front portion 12 to the fully expanded position 12B and retains it thereat, as illustrated in FIG. 1.

Figure 3:
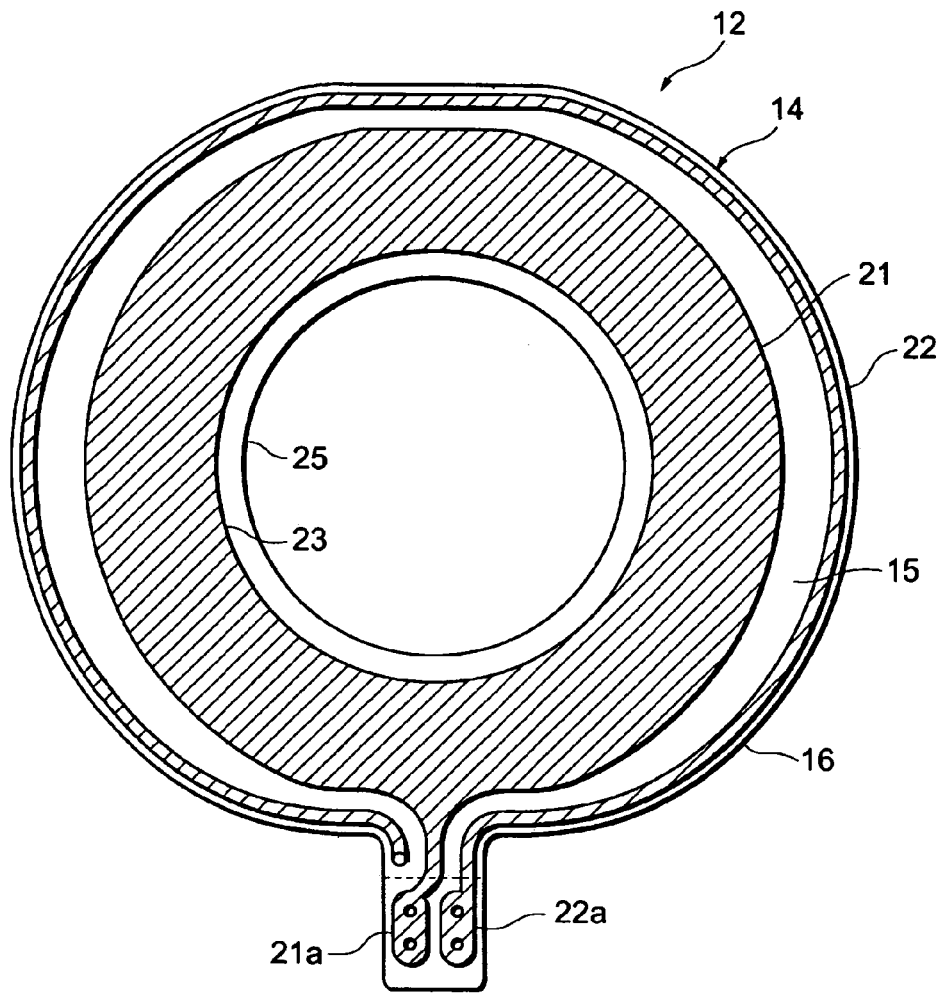
FIG. 3 is a cross sectional view illustrating the headrest front portion.

Described below is the detecting sensor 14 provided in the headrest front portion 12. FIG. 3 is a cross sectional view headrest front portion 12 in a planar or flat direction (left and right direction). As illustrated in FIG. 3, the headrest front portion 12 includes a cushion material 15 covered by a cover 16. The film-shaped detecting sensor 14 is arranged inside of the cushion material 15. The detecting sensor 14 includes an antenna electrode 21 and a ground electrode 22, each of which is formed with a conductive material for example of silver printed, carbon printed, or copper foil. The detecting sensor 14 further includes a film hole 25 at the center thereof. The antenna electrode 21 is formed with a ring-shaped planar flat plate having a hole 23 at the center thereof. This antenna electrode 21 exhibits an approximately identical width in a circumferential direction. The ground electrode 22 has a belt-shaped structure and is arranged along an outer periphery of the antenna electrode 21 with a clearance relative thereto.

The clearance between the antennal electrode 21 and the ground electrode 22 is reduced narrower approaching to an upper portion and a lower portion of the headrest front portion 12. The antenna electrode 21 is provided with a terminal 21a at or near the position of the headrest stay 5, while the ground electrode 22 is provided with a terminal 22a at or near the position of the headrest stay 5. The terminals 21a and 22a are connected with signal lines extending from the ECU 20. A clearance between the terminals 21a and 22a, and further a clearance near the terminals 21a and 22a, which is defined therebetween, are reduced to be narrow.

Figure 4:
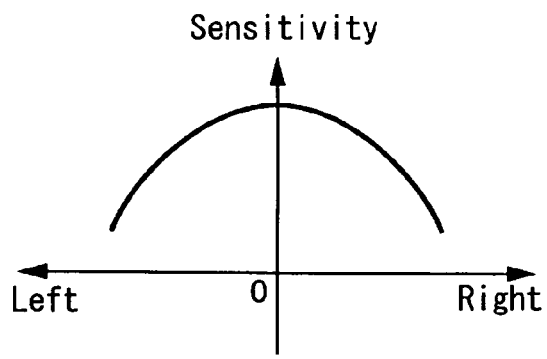
FIG. 4 is a diagram for explaining sensitivity characteristics of a detecting sensor which is provided with an antenna electrode without a hole and is not provided with a ground electrode.

FIG. 4 explains characteristics of sensitivity (strength of electric field) of a detecting sensor which is provided with an antennal electrode without a hole such as the hole 23 and is not provided with a ground electrode such as the ground electrode 22. The detecting sensor, which is provided with the antenna electrode without the hole, possesses the sensitivity characteristics which exhibits a high-sensitivity at the center of the detecting sensor. Further, because the detecting sensor is not provided with the ground electrode 22 surrounding the antenna electrode, the sensitivity characteristics of the detecting sensor are not substantially equal or identical between the central portion and the periphery of the detecting sensor. Therefore, the detection results of the detecting sensor vary depending on the position of a head of an occupant in the planar direction (left and right direction).

Meanwhile, the detecting sensor 14 according to the embodiment includes the antenna electrode 21 having the hole 23 at the center thereof. Therefore, the sensitivity characteristics at or around the center thereof is restrained from being remarkably high, as illustrated in FIG. 5. Further, the detecting sensor 14 is provided with the ground electrode 22 surrounding the antenna electrode 21. Electric flux lines at the periphery of the antenna electrode 21 are hence directed toward a head of a seated occupant. As a result, as illustrated in FIG. 5, it is possible to obtain approximately flat or even sensitivity characteristics from the center to the outer periphery of the detecting sensor 14. That is, the detecting sensor 14 can detect a head of a seated occupant without being influenced by a position of the head of the seated occupant in the planar direction (left and right direction).

As described above, in the seat for a vehicle according to the embodiment, the ground electrode 22 is arranged along an outer periphery of the antenna electrode 21. It is hence possible to prevent electric field, which is generated on the antenna electrode 21, from being emitted to the surroundings. Therefore, antenna directivity for detecting an occupant is enhanced, and an occupant is effectively detected while restraining influences of electric field to the surroundings.

Further, an amount of clearance between the antenna electrode 21 and the ground electrode 22 can be pre-adjusted on the basis of requirements of sensitivity corresponding to strength of electric field generated at the antenna electrode 21. In such cases, it is possible to readily control an initial sensitivity of the detecting sensor 14.

Still further, the antenna electrode 21 of the detecting sensor 4 is provided with the hole 23. Therefore, the sensitivity characteristics at the center of electric field generated at the antenna electrode 21 are restrained from being higher, and the sensitivity characteristics of the detecting sensor 14 are flattened in the detecting area of the detecting sensor 14, which leads to enhancing precision in detecting an occupant. Besides, at an event that a head of a seated occupant comes in contact with the headrest front portion 12, uncomfortable feelings, which the occupant may obtain because of the antenna electrode 21, can be minimized.

Still further, an occupant's head detection is not needed at upper and bottom portions of the detecting sensor 14 and at electric connected portions with the signal lines extending from the ECU 20. Therefore, by positioning the ground electrode 22 closely or proximally to the antenna electrode 21, the sensitivity of the antenna electrode 21 is reduced. As a result, even if a seated occupant at a rear seat puts a hand at an upper or lower portion of the headrest front portion 12, error detecting, which may occur due to such occasions, can be minimized or prevented.

According to the embodiment of the present invention, the antenna electrode 21 is provided with the hole 23 at the center thereof. The sensitivity characteristics of the detecting sensor 14 can be flattened even when the antenna electrode 21 is provided with plural holes at the center thereof. Further, a plate-shaped ground electrode can be arranged at the back side of the antenna electrode 21. In such cases, it is possible to restrain the sensitivity characteristics at the rear side of the antenna electrode 21, which avoids erroneously detecting an occupant seated at a rear seat.

As described above, according to the embodiment of the present invention, it is possible to effectively detect an occupant while restraining influences to the surroundings. Further, because a ground electrode is arranged along an outer periphery of an antenna electrode. It is possible to prevent electric filed generated at the antenna electrode from being emitted to the surroundings. Therefore, antenna directivity in detecting an occupant is enhanced, and an occupant can detect effectively while restraining influences of electric field to the surroundings.

Further, the clearance between the antenna electrode and the ground electrode is adjusted on the basis of requirements of sensitivity corresponding to strength of electric field generated at the antenna electrode. Therefore, an initial sensitivity of the detecting sensor can be controlled with ease.

Still further, the antenna electrode is formed with a hole at the center of the antenna electrode. Therefore, the sensitivity characteristics at or around the center thereof is restrained from being remarkably high, and sensitivity can become even within a detecting area, which leads to enhancement of precision in detecting an occupant. Further, in a cases where the detecting sensor is provided at a headrest, uncomfortable feelings, which an occupant may obtain because of the antenna electrode, can be minimized.

Still further, a planer ground electrode can be located at the backside of the antenna electrode. In this case, it is possible to prevent electric field from being emitted to the back surface of the antenna electrode, which leads to reduction or preventing erroneous detection of an occupant seated at a rear.

Still further, the clearance between the antenna electrode and the ground electrode is narrowed at a connected portion with a signal line. Therefore, electric field generation is minimized at the connected portion with the signal line such that erroneous detection is prevented at the electric connected portion at which occupant detection is not required. Still further, the clearance between the antenna electrode and the ground electrode is narrowed at upper and lower portions of the detecting sensor. Therefore, it is possible to minimize electric field generation at the upper and lower sides of the detecting sensor. In a situation where the detecting sensor is employed for a headrest, even if a seated occupant at a rear seat puts a hand at an upper or lower portion of the headrest, error detecting, which may occur due to such occasions, can be minimized or prevented.

Still further, a hole can be formed at the antenna electrode at the center thereof. Therefore, the sensitivity characteristics at the center of electric field generated at the antenna electrode 21 are restrained from being higher, and the sensitivity characteristics of the detecting sensor 14 are flattened in the detecting area of the detecting sensor 14, which leads to enhancing precision in detecting an occupant. Besides, at an event that a head of a seated occupant comes in contact with the headrest front portion 12, uncomfortable feelings, which the occupant may obtain because of the antenna electrode 21, can be minimized.

This seat 1 can be employed as a driver's seat or as a seat for an occupant seated at a back seat.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat for a vehicle, comprising:
a detecting sensor detecting an occupant, the detecting sensor including a planar antenna electrode, at which an electric field is generated, and a ground electrode arranged with a clearance around an outer periphery of the antenna electrode, wherein the clearance between the antenna electrode and the ground electrode is adjusted on the basis of requirements of sensitivity corresponding to strength of electric field generated at the antenna electrode, wherein the clearance between the antenna electrode and the ground electrode is narrowed at upper and lower portions of the detecting sensor.

2. A seat for a vehicle according to claim 1, wherein the antenna electrode is formed with a hole at a center of the antenna electrode.

3. A seat for a vehicle according to claim 1, wherein the clearance between the antenna electrode and the ground electrode is narrowed at a connected portion with a signal line.

4. A seat for a vehicle according to claim 1, wherein the antenna electrode is a ring-shaped structure and is surrounded by the ground electrode with the clearance relative to the ground electrode.

* * * * *